(12) United States Patent
Eberle

(10) Patent No.: US 9,339,750 B2
(45) Date of Patent: May 17, 2016

(54) FILTER INSERT, AND FILTER COMPRISING A FILTER INSERT AND A HOUSING

(71) Applicant: MANN+HUMMEL GMBH, Ludwigsburg (DE)

(72) Inventor: Heiko Eberle, Lambsheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 46 days.

(21) Appl. No.: 14/181,874

(22) Filed: Feb. 17, 2014

(65) Prior Publication Data

US 2014/0157738 A1 Jun. 12, 2014

Related U.S. Application Data

(63) Continuation of application No. PCT/EP2012/065919, filed on Aug. 15, 2012.

(30) Foreign Application Priority Data

Aug. 17, 2011 (DE) .......................... 10 2011 110 498

(51) Int. Cl.
*B01D 46/00* (2006.01)
*B01D 46/24* (2006.01)

(52) U.S. Cl.
CPC .......... *B01D 46/0005* (2013.01); *B01D 46/003* (2013.01); *B01D 46/0024* (2013.01); *B01D 46/2414* (2013.01); *B01D 2265/04* (2013.01); *B01D 2271/022* (2013.01); *Y10T 29/4973* (2015.01)

(58) Field of Classification Search
CPC ........... B01D 46/0001; B01D 46/0005; B01D 46/0024; B01D 46/003; B01D 46/2411; B01D 46/2414; B01D 2265/04; B01D 2271/022
See application file for complete search history.

(56) References Cited

U.S. PATENT DOCUMENTS

| | | | | |
|---|---|---|---|---|
| 5,605,555 A | * | 2/1997 | Patel et al. ...................... | 55/502 |
| 6,093,231 A | * | 7/2000 | Read et al. ...................... | 55/498 |
| 6,797,025 B2 | * | 9/2004 | Linnersten et al. ............. | 55/319 |
| 8,114,278 B2 | | 2/2012 | Lorente et al. | |
| 2006/0201871 A1 | * | 9/2006 | Gillenberg et al. ........... | 210/450 |
| 2008/0245717 A1 | * | 10/2008 | Heikamp ...................... | 210/225 |

FOREIGN PATENT DOCUMENTS

| | | |
|---|---|---|
| DE | 19910821 A1 | 6/2000 |
| DE | 10233012 A1 | 2/2004 |
| DE | 202006002383 U1 | 7/2006 |
| DE | 202005014125 U1 | 1/2007 |
| GB | 2056307 A | 3/1981 |

OTHER PUBLICATIONS

PCT search report of PCT/EP2012/065919, dated Nov. 27, 2012.

* cited by examiner

*Primary Examiner* — Robert Clemente
(74) *Attorney, Agent, or Firm* — James Hasselbeck

(57) ABSTRACT

A filter (10) for removing oil from air exiting an air compressor or a vacuum pump includes a housing (11) and at least one filter element (12, 13), the end region of which is adhesively bonded to a flange (14). The flange (14) has a flanged edge (15) and a bead (16) which is adjacently arranged to the edge, the edge and the bead together forming a groove (17) into which the filter element (12, 13) and an adhesive (20) is introduced.

8 Claims, 2 Drawing Sheets

FILTER INSERT, AND FILTER COMPRISING A FILTER INSERT AND A HOUSING

CROSS-REFERENCE TO RELATED APPLICATIONS

This application is a continuation application of international application No. PCT/EP2012/065919 having an international filing date of Aug. 15, 2012 and designating the United States of America, the international application claiming a priority date of Aug. 17, 2011, based on prior filed German patent application No. 10 2011 110 498.8, the entire contents of the aforesaid international application and the aforesaid German patent application being incorporated herein by reference.

TECHNICAL FIELD

The invention relates to a filter insert for installation in a housing, and to the use thereof for removing oil from air originating from an air compressor or a vacuum pump, comprising at least one filter element that in its end region is adhesively bonded to a flange. The invention further relates to a filter comprising a filter insert and a housing having a cover, and to a method for installing a filter insert in a housing having a cover.

BACKGROUND

A generic filter is known from the prior art, the flange thereof having a shoulder that protrudes inside the filter. The shoulder has a tendency to bend outwardly in the case of high pressures prevailing inside the filter, as a result of which the filter element can disengage from the flange, or the filter element can be damaged.

The object of the invention is to improve the filter of the aforementioned kind in such a way that the filter element remains functional even at high pressures.

SUMMARY OF THE INVENTION

The invention achieves the stated object with a filter insert in particular for removing oil from air that originates from an air compressor or a vacuum pump, the filter insert being installable in a housing, in particular a pressure vessel, and comprising at least one hollow cylindrical filter element that is adhesively bonded to a flange in an axial end region, using an adhesive, wherein the flange has an edge that is in particular flanged or folded down, and a bead arranged adjacently thereto which together form a groove, which in particular is circular, into which the filter element and the adhesive are introduced. The bead results in greater stiffness of the flange without the need for the flange, which preferably is made from sheet metal, to have a greater thickness than heretofore. Due to the increased stiffness of the flange, it is almost impossible for the flange to deform, thus maintaining the functionality of the filter element even at high pressures. The filter element can be reliably secured in the groove by means of the adhesive. Due to the bead and the edge, the groove is exceptionally stable, so that it is hardly deformable even at extremely high pressures. Furthermore, the groove forms a precisely defined space for receiving the adhesive, so that the adhesive is available exactly at the place where it is needed. In the groove, the filter element is adhesively bonded to the flange not only at its front side, but also in its peripheral regions located opposite from the edge and the bead. Accordingly, a particularly reliable adhesive bond is ensured, which ensures the functionality of the filter even at extremely high pressures. The bead is in particular formed as an annular indentation which is introduced into the flange and which represents an elevation that delimits the groove on the other side of the flange, and therefore on the side of the groove.

The flange can be produced from sheet metal in a particularly cost-effective manner, for example by deep drawing. Sheet steel, for example, can be used for high strength.

The flange is preferably formed as a mounting flange for mounting the filter insert in a housing.

The flange is preferably designed as a substantially flat disc, preferably ring-shaped with a central opening, and in particular has a circular ring shape. More preferably, the edge delimits a central opening that can serve as an outflow opening for cleaned gas from the interior of the ring-shaped filter element. The groove is formed in a simple manner in that the edge and the bead of the flange, which in particular is substantially disc-shaped, extend in the same axial direction. The edge and the bead preferably extend substantially equidistantly from the groove base by an amount ranging between 5 and 30 mm. Height differences between the edge and the bead preferably lie in a range less than 20%, based on the overall height of the smaller element. The term "axial direction" means parallel to a central axis of symmetry of the ring-shaped filter element and of the ring-shaped flange and/or of the central, in particular circular, opening of the flange. Through these measures, the filter saves installation space with the edge and the bead protruding inside the filter.

In a preferred embodiment, the edge is inclined toward the filter element with respect to the axial direction; i.e., the edge at its end is closer to the filter element than in the region of the groove base. In this manner, an outflow opening can be formed that widens toward the interior of the filter insert or the ring-shaped filter insert, thus minimizing the pressure loss of the filter insert. Furthermore, in this way a support tube can be supported at the edge in a pressure-resistant manner without risking a poor adhesive bond to the flange due to insufficient adhesive volume in the region of the edge and the support tube.

On the side of the filter element or elements that faces the flange, the filter elements are connected in a non-detachable manner to an end disc which in particular is closed. The end disc is preferably made of sheet metal, and is joined to the filter element or elements by means of an adhesive.

It is particularly preferred that the groove base is flat. On the one hand adhesive bonding of filter elements in the groove is facilitated, and on the other hand, support of the flange on the cover is optimized.

The flange preferably has a radially outwardly situated ring-shaped sealing region which is substantially flat and which surrounds the groove. The flange is preferably braceable between a housing and a cover. More preferably, in the sealing region the flange has in particular ring-shaped seals on one or both of the flat sides of the flange for sealing the filter insert in the housing and/or for sealingly separating the unclean side from the clean side. Preferably, a seal is situated on both sides of the flange and in particular is connected to the flange in a detachable or nondetachable manner. The sealing region can preferably be braced between a housing and a cover in such a manner that sealing of the housing interior from the outside as well as a tightly sealed separation of the unclean side and the clean side within the housing is achieved.

In one embodiment, the flange forms a supporting region on the surface opposite from the groove, in particular for axially supporting the flange and/or the filter insert on a cover. The flange can thus be supported on the cover in the region of the groove during operation under compressive load, thereby avoiding or minimizing deformation of the flange under pressure, in particular in the region of the groove. This is important in particular with regard to the tight adhesive bond of the filter element in the groove, since excessive deformation of the groove could result in overload of the adhesively bonded area, and thus, the risk of leaks.

The groove and/or the support region together with the sealing region preferably lie substantially in one plane, thereby enabling simple assembly of the filter insert in a housing, using a flat cover. This is advantageous with regard to cost-effective production of the cover and also with regard to the compressive strength of the cover when it is used as the housing on a pressure vessel.

In a preferred embodiment, the filter insert has a primary filter element and a secondary filter element. As a result, the filter insert operates in a particularly effective manner. The primary filter insert is preferably designed as a coalescing filter element, in which droplets of the liquid to be separated accumulate and coalesce to form larger droplets, thus allowing large oil droplets to be filtered in a particularly effective manner. The primary filter element is preferably arranged radially outside the secondary filter element, and therefore faces the unclean side of the filter insert.

In one embodiment, a support plate having first holes is situated between the primary filter element and the secondary filter element. The primary filter element preferably rests radially outwardly against the support plate, and during operation is supported by same when gas passes radially from the outside to the inside. A support plate having second holes is preferably situated on the secondary filter element. The secondary filter element preferably rests radially outwardly against the second support plate, and during operation is supported by same when gas passes radially from the outside to the inside. It is particularly preferred that the support plate or the support plates is/are introduced together with the filter elements into the groove and are adhesively bonded there to the flange. More preferably, the support plate or the support plates together with the filter element or the filter elements are likewise adhesively bonded to the end disc on the side of the filter insert opposite from the flange.

In a preferred embodiment, the outside of the primary filter element is spaced apart from the radially inner surface of the bead by at least 3 mm, preferably at least 5 mm, to allow simple dosing of the adhesive. The distance of the outer side of the primary filter from the radially inner surface of the bead is particularly preferably at least twice the distance of the radially inner side of the edge from a support tube adjacent to this edge.

The invention further relates to a filter comprising a housing having a cover, and a filter insert according to the invention that is insertable into the housing, wherein the filter insert can be arranged in the housing in such a manner that the edge and the bead protrude into the interior of the filter, and thus into the interior of the filter housing. Thus, the opening of the groove and the filter elements situated therein likewise extend, starting from the flange, toward the inside of the filter.

The flange, in particular at the support region, preferably rests against the cover of the housing in the region of the groove. This can be configured, for example, in such a manner that in this region the flange already rests against the cover of the housing during assembly. When air to be cleaned radially flows through the vessel and the filter insert from the outside to the inside, a differential pressure is present on the filter insert and thus on the flange, the flange being subjected to load by the differential pressure in the direction of the cover, and being supported on the cover so that the forces exerted on the flange due to the pressure difference are supported on the cover, and undesired deformation of the flange and the groove is avoided.

Likewise, in the pressureless state the region may be slightly spaced apart from the cover, and during operation may rest against the cover due to a slight deformation of the flange caused by the applied pressure. This is in particular advantageous in that the sealing region and the support region can be designed in a simple manner so that they lie in a common plane. As the result of a seal, in particular a flat seal having a thickness of 0.5 to 5 mm, preferably 1 to 3 mm, mounted on the flange on the side of the cover in the sealing region, in this case in the support region and in the region of the groove, the flange is approximately equidistant from the cover in the pressureless state. When air to be cleaned flows radially through the vessel and the filter insert from the outside to the inside, a differential pressure is present on the filter insert and therefore also on the flange, the flange being elastically deformed by this differential pressure toward the cover and resting against same, so that the forces exerted on the flange due to the pressure difference are supported on the cover.

The invention further relates to the use of a filter insert according to the invention in a filter, the filter further comprising a housing having a cover, the flange being braceable in particular in the sealing region between the housing and the cover, and in particular during operation and/or when differential pressure is applied to the filter element, in the region of the groove rests, in particular at the support region, against the cover of the housing. A filter insert can thus be operated in a housing in a simple and permanently pressure-resistant and alternating pressure-resistant manner.

The invention further relates to a method for installing a filter insert according to the [invention] in a housing having a cover, in particular for forming a filter, wherein the filter insert is inserted into the housing when the cover is open, and the cover is subsequently mounted on the housing, wherein the flange is braced in particular in the sealing region between the housing and the cover, wherein the groove is positioned such that in the region of the groove, the flange rests, in particular at the support region, against the cover of the housing, or during operation, due to the differential pressure applied to the filter element, may rest, in particular at the support region, against the cover of the housing in the region of the groove. A filter insert can thus be installed in a housing in a simple and permanently pressure-resistant and alternating pressure-resistant manner.

The invention described herein can be advantageously used in filtration applications in which high static or dynamic pressures occur. This may involve, for example, the separation of liquids from pressurized gases, for example in compressors or vacuum pumps, in particular in the pressure containers thereof, but on the other hand this can also be important for the filtration of liquids for separating particles therefrom, in particular for oil filtration of lubrication oil of internal combustion engines, or in hydraulic applications.

BRIEF DESCRIPTION OF THE DRAWINGS

The filter according to the invention is explained in greater detail below with reference to the accompanying drawings.

In the figures.

DESCRIPTION OF THE PREFERRED EMBODIMENTS

Figure 1:
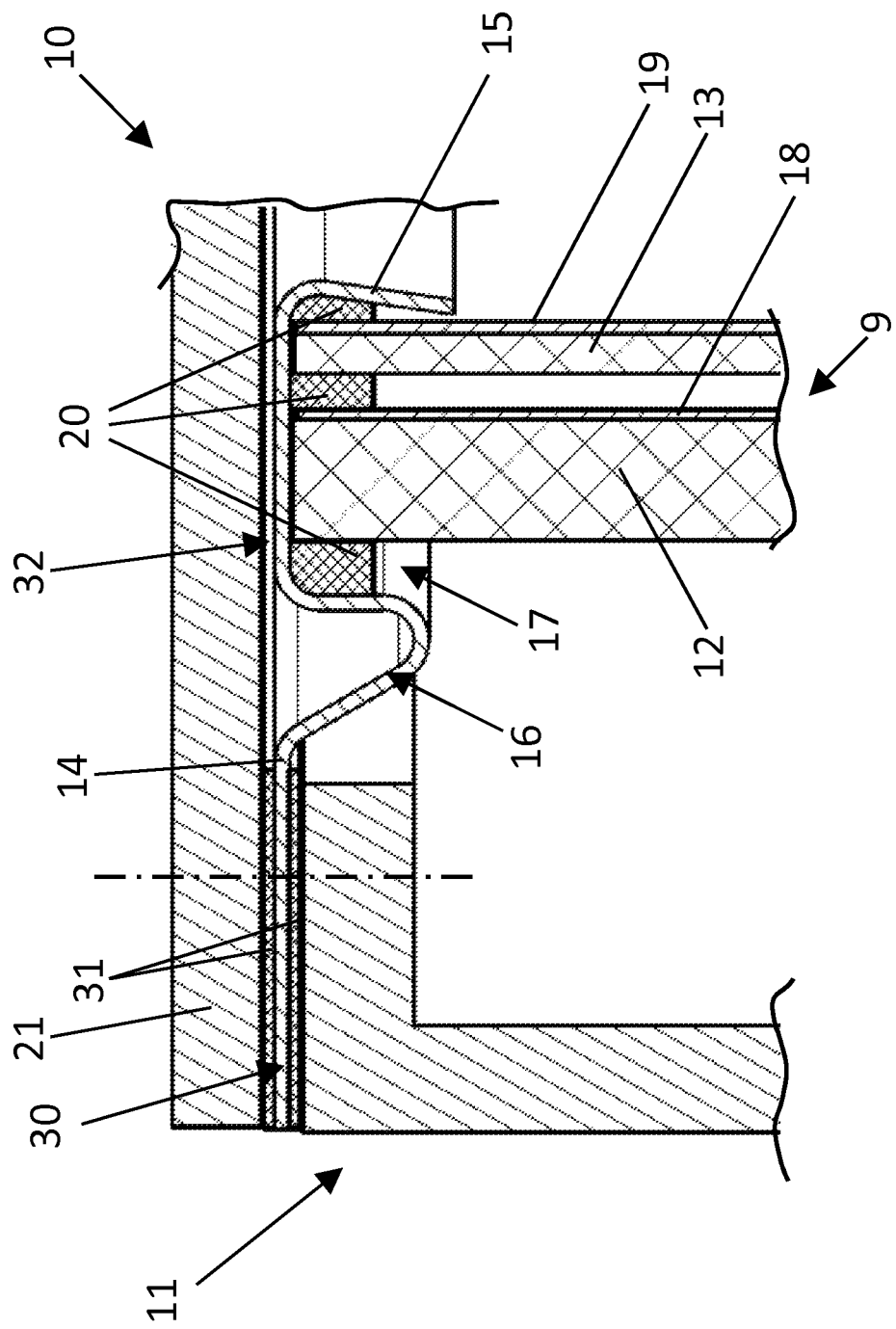
FIG. 1 shows a detail of a sectional view of a filter.
Figure 2:
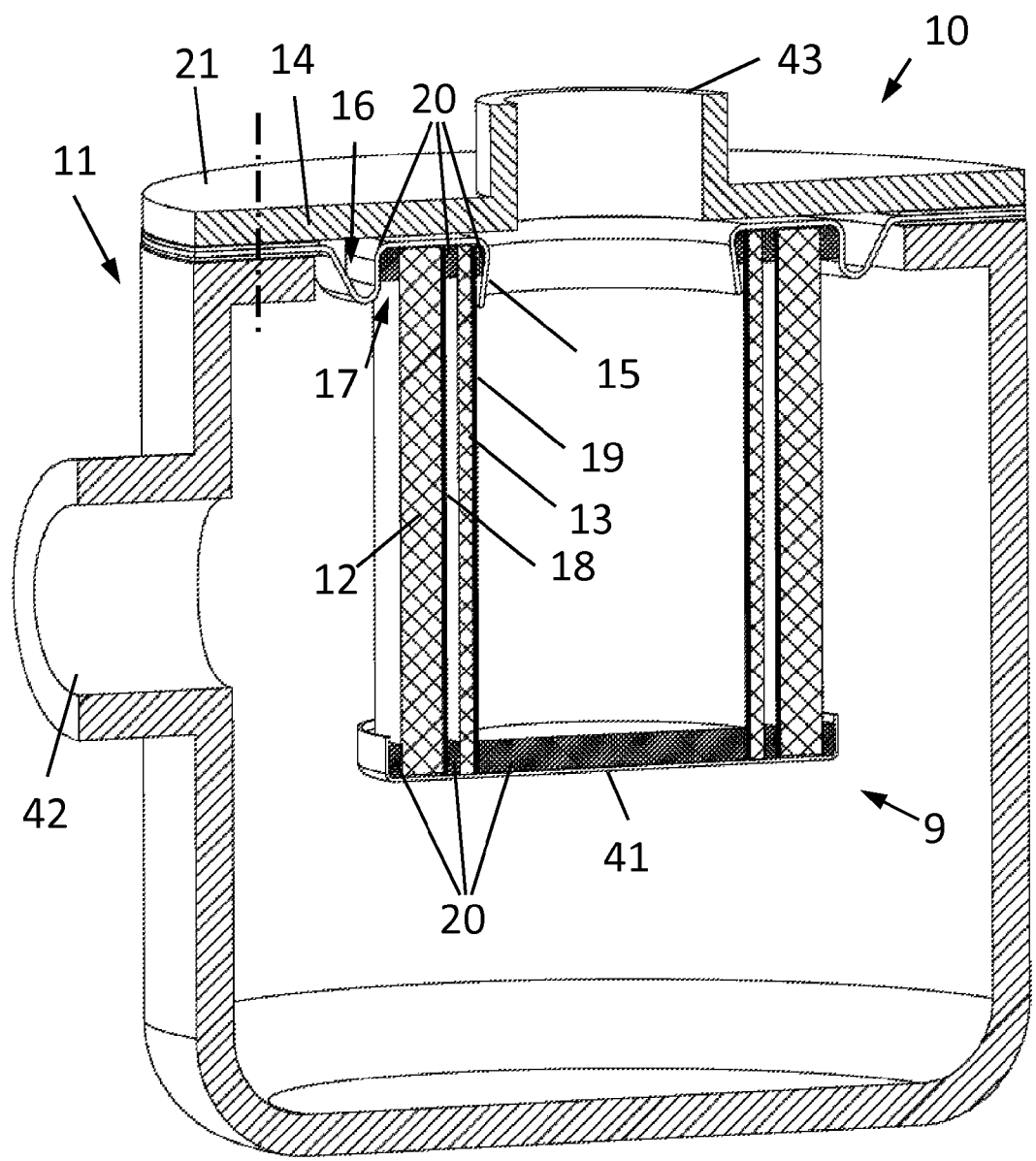
FIG. 2 shows a sectioned perspective view of a filter.

FIGS. 1 and 2 show a filter 10 comprising a filter insert 9 for removing oil from air that may originate from an air compressor (not illustrated in greater detail) or from a vacuum pump (likewise not illustrated in greater detail), the filter insert comprising a housing 11 and filter elements 12 and 13. The filter element 12, through which the oil-containing air first flows, is a primary filter element, and the filter element is a secondary filter element. The primary and secondary filter elements 12, 13 are connected by an adhesive bond by means of an adhesive 20 to a flange having a central outflow opening and to a closed end disc 41 to form a replaceable filter insert 9. The end disc and the flange are preferably made of sheet metal, for example sheet steel. The housing 11 is in particular a pressure vessel of a vacuum pump or an air compressor, for example. The housing 11 has an inlet opening 42 for air to be cleaned, and the cover 21 has an outlet opening 43 for cleaned air which is in fluid communication with the outflow opening of the flange, which is formed by an edge 15 and which can preferably be brought into alignment with the outflow opening, as shown in FIG. 2.

The filter insert 9 has a flange 14 that is provided with an edge 15 which in particular is flanged, and a bead 16. The edge 15 and the bead 16 extend axially in the same direction, thereby forming a groove 17 into which the filter elements 12 and a support plate 18 comprising first holes, a support plate 19 comprising second holes, and an adhesive 20 are introduced, the filter elements 12, 13 and the support plates 17, 18 being connected or permanently secured to the flange in a nondetachable manner by means of the adhesive. The groove 17 forms a precisely defined space so that the adhesive 20 is available precisely where it is required. The adhesive thus secures the filter elements 12 and 13 to the flange 14 at the front sides and edge regions of the filter elements opposite from the flanged edge 15 and the bead 16.

The support plate 18 supports the filter element 12 which serves as the primary filter element, and the support plate 19 supports the filter element 13 which serves as the secondary filter element. In this manner, the filter elements 12 and 13 are able to reliably maintain their shape even at very high pressure, thus protecting them from undesirable damage.

The edge 15, which in particular is flanged, and the bead 16 protrude inside the filter 10. Thus, the flange 14 can rest or abut directly against a cover 21 of the housing 11 in the support region 32 facing the groove 17. As a result, the flange 14 is able to withstand very high pressure inside the filter 10. Moreover, due to edge 15 and the bead 16 which protrude inside the filter 10, the filter 10 saves installation space.

In the sealing region 30 of the flange 14, the filter insert 9 is braced with the flange between the housing and the cover 21, wherein in each case a seal 31 which in particular is flat and ring-shaped is situated between the flange 14 and the housing 11 as well as the cover 21, so that the unclean side, radially outside the filter elements, and the clean side, radially inside the filter elements, are sealingly separated from each other. Furthermore, the seals 31 also seal the housing from the outside.

The support region 32 lies in the same plane as the sealing region 30 of the flange, and, due to the seal 31 situated between the cover 21 and the flange 14, is spaced apart by the thickness of the seal in the assembled and pressureless state. During operation, the flow passes through the filter insert from the outside to the inside, whereby a pressure difference is present on the filter insert 9 and the flange 14 which results in a force that acts on the flange axially in the direction of the cover 21. During operation, this force slightly elastically deforms the flange 14 axially in the direction of the cover 21, whereupon the support region 32 directly contacts and comes to rest on the cover and is supported thereon. Severe deformation of the flange 14, which could result in the risk of leaks at the adhesive bond 20, is thus avoided in an effective and cost-effective manner.

What is claimed is:

1. A filter comprising:
 a housing having an open end opening into a receptacle in an interior of the housing;
 a filter insert that is replaceably inserted into the receptacle, the filter insert comprising:
  at least one hollow cylindrical filter element;
  a flange adhesively bonded onto an axial end of the at least one hollow cylindrical filter element, the adhesive arranged at and extending into an axial end region of the at least one hollow cylindrical filter element;
  wherein the flange has an axially inwardly extending edge that is flanged and arranged in a radial interior of the at least one hollow cylindrical filter element;
  wherein the flange has an axially inwardly extending annular bead arranged adjacently to the radially inner edge and at a radially outer side of the at least one hollow cylindrical filter element;
  wherein spacing of the edge and bead form an axially inwardly open circular groove in the axially inner side of the flange;
  wherein the axial end of the at least one hollow cylindrical filter element is arranged in the circular groove of the flange;
  wherein the adhesive is arranged within the groove and on the axial end of the at least one hollow cylindrical filter element, the adhesive securing the at least one hollow cylindrical filter element into the groove of the flange;
  wherein an axially outer face of the flange between the bead and the edge of the groove forms a ring shaped support region in the axially outer face of the flange;
  wherein in a non-operating pressureless state, the support region of the flange and a the sealing region of the flange lie substantially in one plane;
  wherein, when in a pressurized operating state, the support region elastically deforms axially outwardly relative to the sealing region, to contact against and receive support on an interior side of the housing;
  wherein the at least one hollow cylindrical filter element includes:
   a cylindrical primary filter element; and
   a cylindrical secondary filter element; and
  wherein the primary filter element is a coalescing filter element; and
 a cover arranged over the filter insert and closing over the open end of the housing;
 wherein the flange edge and the flange bead protrude axially into the receptacle;
 wherein, when in the operating state, the support region elastically deforms axially outwardly to contact against and rest against an interior side of the cover.

2. The filter according to claim 1, wherein
 the coalescing filter separates oil from air;
 wherein the sealing region of the flange of the filter insert is secured between and braceable between the housing and the cover;
 wherein the flange is elastically deflectable during operation by differential pressure on the filter element;
 wherein the support region of the flange rests directly upon an interior side of the cover of the housing in the region of the circular groove when acted upon by differential pressure.

3. The filter according to claim 1, wherein the a radially inner face of the edge defines a central flow opening extending through the flange, the central opening forming an inflow or outflow opening into an open interior of the at least one hollow cylindrical filter element.

4. The filter according to claim 1, wherein the primary filter element is a coalescing filter element.

5. The filter according to claim 1, wherein an axially extending support plate having first holes therethrough is arranged radially between the primary filter element and the secondary filter element.

6. The filter according to claim 1, wherein a second axially extending support plate having second holes therethrough is arranged on a radially inner face of the secondary filter element.

7. The filter according to claim 6, wherein axial outer edges of the first support plate and the second support plate are received into the groove in the flange.

8. A method of installing a filter insert into the filter according to claim 1, comprising:
- removing the cover from the housing;
- inserting the filter insert into the receptacle in the housing;
- bracing the sealing region of the flange between the housing and the cover;
- positioning the flange on the housing such that the ring shaped support region is restable against the cover of the housing;
- applying a differential pressure to the filter insert;
- deflecting the flange axially such that the support region of the flange rests directly upon an interior side of the cover of the housing in the region of the groove when acted upon by differential pressure.

* * * * *